Patented Oct. 3, 1950

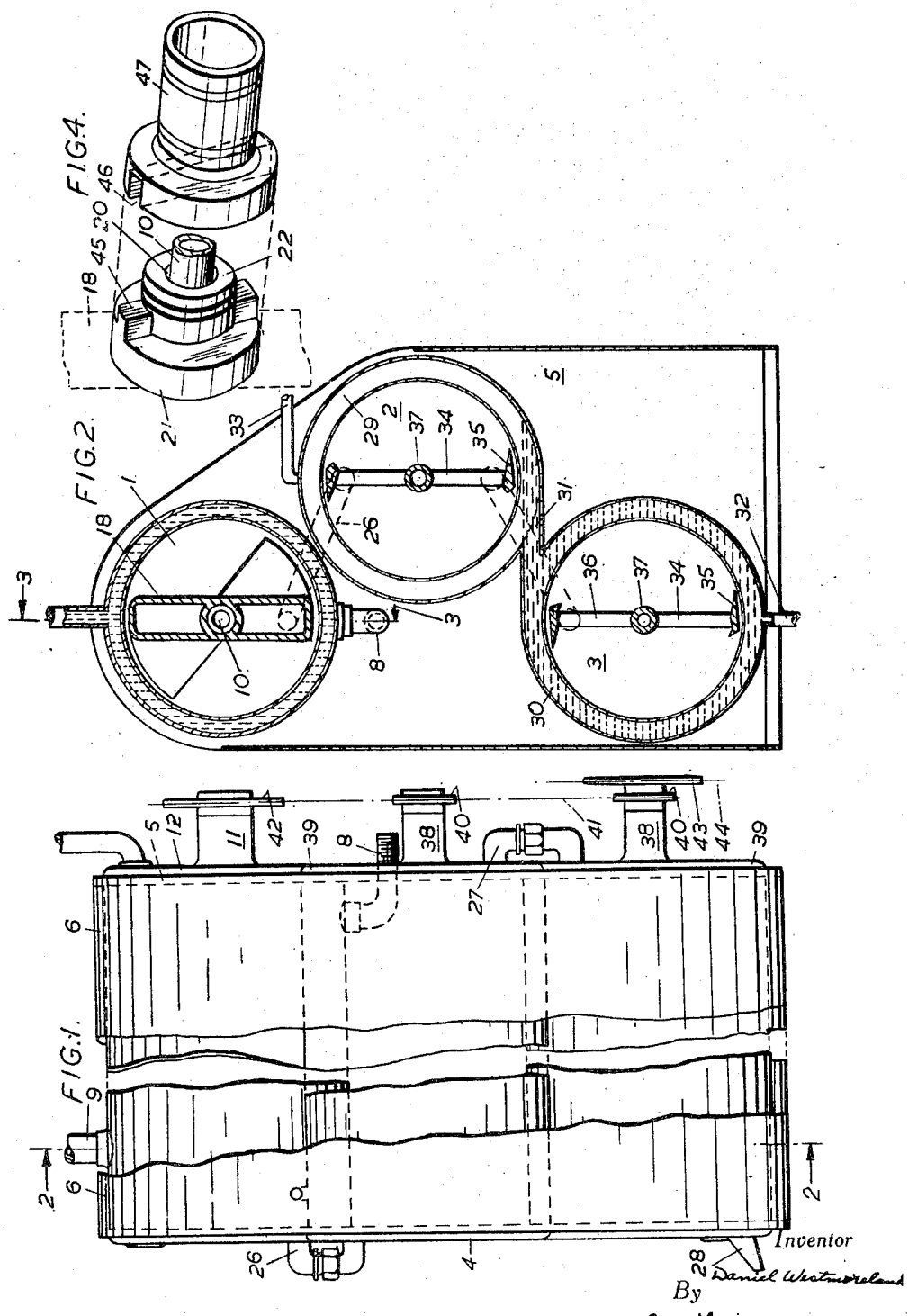

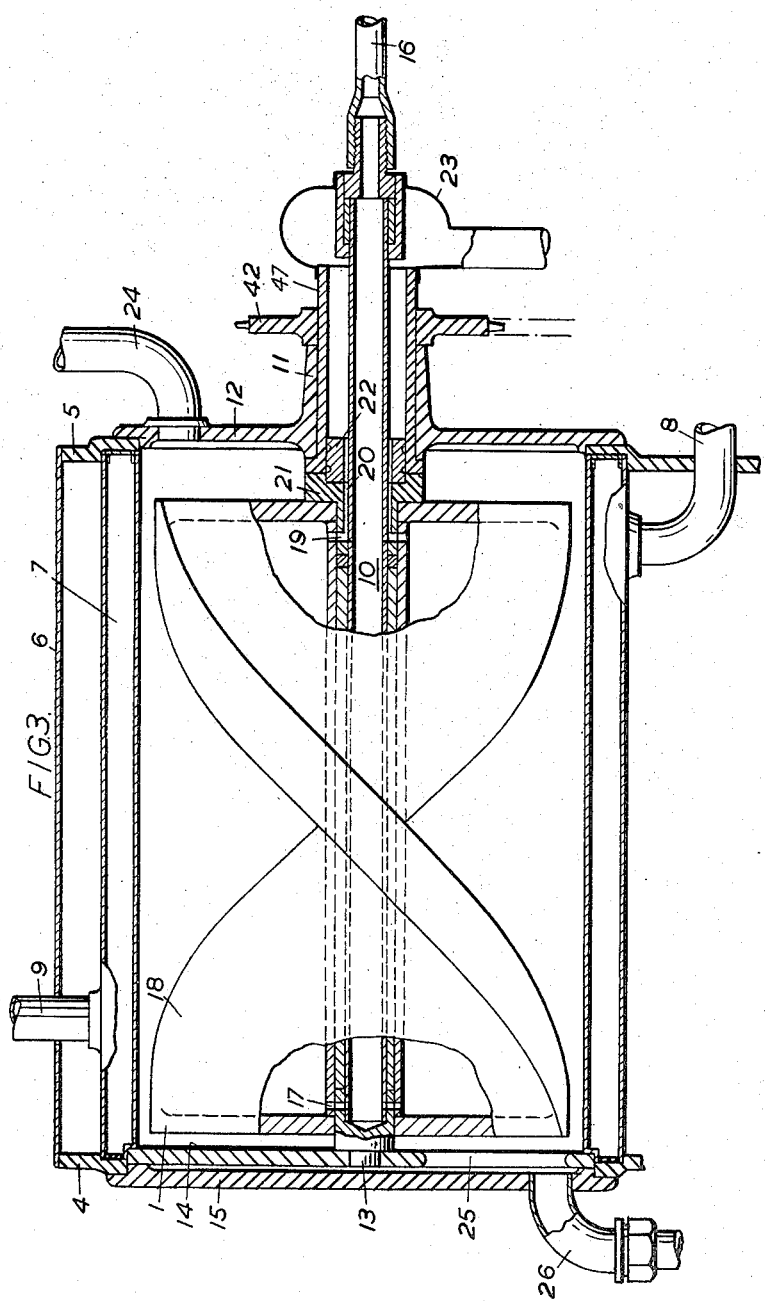

2,524,616

UNITED STATES PATENT OFFICE 2,524,616

APPARATUS FOR THE PRODUCTION OF ICE CREAM

Daniel Westmoreland, Sheffield, England

Application February 3, 1949, Serial No. 74,422
In Great Britain February 4, 1948

5 Claims. (Cl. 62—114)

1

This invention relates to apparatus for the production of ice cream, an object of the invention being to provide apparatus adapted to ensure hygienic conditions in the cooling, chilling, and freezing of the ice cream. A further object is the production of a self-contained unit for the cooling, chilling, and freezing mentioned above.

Apparatus according to the invention comprises a cylinder with double walls forming a jacket, end covers for the cylinder, a rotatable central shaft in a bearing at at least one end of the cylinder, a mixer on the shaft, inlet and outlet connections at opposite ends of the interior of the cylinder for the continuous feeding of ice cream mixture through the cylinder, and inlet and outlet connections for the circulation of coolant through the jacket. The coolant may serve as a refrigerant, dependant on the stage at which the cylinder is used.

For use as a cooler, receiving the mixture direct from a homogeniser, the cylinder is cooled by water, and the shaft and the mixer are hollow for the circulation of coolant (usually water) fed to the bore of the central shaft, a communicating passage being provided between the shaft and one end of the mixer, and an outlet connection being provided for the mixer at the end opposite to that with the communicating passage. The mixer preferably acts as a scraper to prevent the lodging on the cylinder wall of mixture stiffened by the cooling, and to assist in the transfer of heat from the jacket at the same time as mixing the mixture.

The shaft is divided near a bearing at one end of the cylinder, the two parts being connected by a dog clutch to enable the shaft and the mixer to be removed when the cover at the other end of the cylinder is detached. The interior of the cylinder and the shaft and mixer may be thoroughly cleaned and sterilised.

For use as a chiller, the cylinder may be simply cooled by the evaporation of refrigerant in the jacket, the mixer carrying scrapers, which may also serve to propel the now stiffening mixture through the cylinder. The mixer itself not being cooled, it need not be hollow. The refrigeration should be such as to cool the mixture to about 40° F. as it passes to the freezer.

The freezer may be identical with the chiller, or substantially so, cooling to below freezing point being effected simply by refrigerant in the jacket, the jacket preferably remaining filled. Again, the mixer may be solid.

Three cylinders, serving respectively as cooler, chiller, and freezer may be provided with series connections for the ice cream mixture, connections for coolant to the jacket of the cooler, and series connections for refrigerant to the jackets of the chiller and the freezer.

The mixture, received from the usual homogeniser, passes in turn through the cooler, the chiller, and the freezer, without being handled. Transfer of the mixture from one part to the other is preferably through screwed unions, which may be broken, if required, for the thorough cleaning of the apparatus but permitting the mixture to be completely enclosed during its transformation into frozen ice cream.

The three cylinders may be assembled as a unit, together with means for driving the mixing shafts of the cooler, the chiller, and the freezer. Chromium-plated finish and stainless steel are preferably used to provide non-corroding and easily cleaned surfaces.

The invention will now be described in greater detail with reference to the accompanying drawings, in which Figure 1 is a shortened side elevation of the complete apparatus with part of the housing broken away;

Figure 2 is a section on the line 2—2 of Figure 2;

Figure 3 is an enlarged section of part of Figure 2 taken on the line 3—3; and Figure 4 shows a detail in perspective.

The cooler 1, chiller 2, and freezer 3 lie horizontally, somewhat staggered one above the other and extend between end plates 4, 5, the whole being encased by a sheet metal housing 6. The cooler 1 is double-walled to form an annular water jacket 7 with lower inlet 8 and upper outlet 9. A tubular shaft 10 is supported in a bearing boss 11 in a cover plate 12 secured to the end plate 5 and its far end has a bearing 13 in a removable plate 14 spigoted in the end of the cooler within a cover plate 15 secured to the end plate 4. Cooling water supplied through a pipe 16 passes through the hollow shaft 10 to its far end and then emerges by holes 17 into the inside of a hollow mixer 18 in the form of a two-start helical impeller. The water escapes from the other end of the mixer by holes 19 and by passages 20 through the bushes 21, 22 and is led to waste by a collector 23.

After hot ice cream mixture has been prepared in a boiler in the usual way and pumped under a pressure of say 1000 lb. per square inch or even higher to a homogeniser comprising the usual chamber and jet of small cross-sectional area, the mixture, reduced to a low pressure by a relief valve, is led without contact with the air to the inlet 24 of the cooler 1. During its slow passage through the interior of the cooler, in which it is mixed and propelled by the helical mixer 18, the mixture is prevented from lodging on the cylinder wall as it stiffens under cooling because of the scraping action of the mixture. The clearance between the periphery of the mixer and the cylinder wall may be made such as to permit at the most only a very thin layer to form (the clearance being somewhat exaggerated in Figure 3), the thinner the layer the greater the transfer of heat from the mixture to the water in the jacket.

At the end opposite to the inlet 24, the cooled mixture leaves through a hole 25 in the plate 14 to a pipe 26 serving also as an inlet connection to the adjacent end of the chiller 2. (The position of the pipe 26 is shown by dotted lines in Figure 2, although strictly the pipe should not appear in the section represented by this figure.) After traversing the chiller, the mixture leaves by a pipe 27 at the other end serving as a connection to the adjacent end of the freezer 3, leaving at the other end by an outlet spout 28. The chiller 2 and the freezer 3 are double-walled to form jackets 29, 30 connected by a pipe 31, liquid refrigerant entering the jacket 30 of the freezer by an inlet 32 and completely filling the jacket. Evaporation takes place in the jacket 29 of the cooler 2 and the gas returns by an outlet 33 to the condensing unit (not shown) for re-use. The chiller and the freezer may be surrounded by any suitable lagging (not shown).

The chiller and the freezer contain similar rotatable scraping devices 34 each having scrapers 35 carried by arms 36 from central shafts 37, the scrapers 35 covering the full length of the interiors of the chiller and the freezer and assisting to propel the mixture lengthwise of the cylinders to prevent lodging on the cylinder walls. The shafts 37 emerge from bearing bosses 38 in cover plates 39 similar to the cover plate 12 and are fitted with chain sprockets 40 connected by a chain 41 which passes to a larger sprocket 42 driving the shaft 10 of the cooler 1. The lower sprocket 40 is connected to a sprocket 43 driven by a chain 44 from a suitable source of power. A convenient speed for the freezer and the chiller is 120 R. P. M. and for the cooler 60 R. P. M.

The cooled mixture passes steadily from the cooler 1 to the chiller 2 and thence to the freezer 3 to emerge at the spout 28 for collection in any suitable receptacle. By connecting the inlet 24 direct to the outlet of an homogeniser, the whole progression of the homogenised mixture through the cooler, chiller, and freezer is out of contact with the air. It therefore remains for the operator to keep the apparatus itself clean and sterile, which in the ordinary way may be effected by first passing water into the apparatus through the mixture connection 24 to flush the interior and then passing steam into the apparatus.

The internal mechanism may be readily inspected because of the clear access afforded to the cylinders by removing the covers at the end remote from the driving sprockets, and breaking the unions of the connecting pipes 26, 27, which may then be sterilised together with the covers.

The mixer 18 and the scraper devices 34 may be withdrawn from the cylinders, a dog-clutch 45, 46 as shown for the mixer in Figure 4 permitting this to be done, and these members may be sterilised, as also the interiors of the cylinders. The one half 45 of the dog clutch is formed on the bush 21 secured to the mixer 18 and the other half 46 on the sleeve 47 passing through the bearing boss 11 to carry the driving sprocket 42. The bushes and sleeves have suitable sealing rings to prevent escape of the mixture.

What I claim is:

1. Apparatus for the production of ice cream, comprising three jacketed cylinders disposed horizontally one above the other, with closed series connections between the interiors of the cylinders to permit the flow of ice cream mixture through the cylinders in turn, a hollow mixer rotatable in the uppermost cylinder, and connections for the supply of coolant to the jacket of that cylinder and to the hollow mixer, mixers rotatable in the two lower cylinders, and series connections for the supply of refrigerant to and through the jackets of the lower cylinders, said connections permitting the flooding of the jacket of the lowest cylinder to freeze the mixture and the evaporation of refrigerant in the jacket of the second cylinder to effect chilling preparatory to freezing.

2. Apparatus as in claim 1, comprising end plates between which the cylinders are mounted, the cylinders being somewhat staggered with respect to each other.

3. Apparatus as in claim 1, comprising common driving means for the three mixers at one end of the cylinders, said means providing for driving the mixer of the uppermost cylinder at a lower rate than the mixers of the other two cylinders.

4. Apparatus as in claim 3, comprising a removable cover at the end of each cylinder remote from the driving means, and a dog-clutch near the other end of the cylinder between the driving means and the mixer to permit removal of the mixer from the cylinder after removal of the cover without disturbing the driving means.

5. Apparatus as in claim 4, comprising a bearing for the mixer in the removable cover.

DANIEL WESTMORELAND.

REFERENCES CITED

The following references are of record in the file of this patent:

UNITED STATES PATENTS

| Number | Name | Date |
|---|---|---|
| 1,442,945 | Hauk | Jan. 23, 1923 |
| 1,882,660 | Glauser | Oct. 18, 1932 |
| 1,938,880 | White | Dec. 12, 1933 |
| 2,191,344 | Erickson | Feb. 20, 1940 |
| 2,282,662 | Lindsey | May 12, 1942 |
| 2,298,903 | Schaub | Oct. 13, 1942 |